April 24, 1951 K. W. GRAYBILL ET AL 2,550,241

CROSSBAR SWITCHING DEVICE

Filed June 29, 1945 6 Sheets-Sheet 1

INVENTORS.
KENNETH W. GRAYBILL
HANS SENGEBUSCH

BY [signature]

ATTORNEY

CROSSBAR SWITCHING DEVICE

Filed June 29, 1945 6 Sheets-Sheet 2

INVENTORS.
KENNETH W. GRAYBILL
HANS SENGEBUSCH
BY [signature]
ATTORNEY

April 24, 1951 K. W. GRAYBILL ET AL 2,550,241

CROSSBAR SWITCHING DEVICE

Filed June 29, 1945 6 Sheets-Sheet 3

INVENTOR.
KENNETH W. GRAYBILL
HANS SENGEBUSCH

BY [signature]

ATTORNEY

April 24, 1951 K. W. GRAYBILL ET AL 2,550,241

CROSSBAR SWITCHING DEVICE

Filed June 29, 1945 6 Sheets-Sheet 4

*INVENTORS.*
KENNETH W. GRAYBILL
HANS SENGEBUSCH
BY
Chas. W. Candy
ATTORNEY

April 24, 1951 K. W. GRAYBILL ET AL 2,550,241

CROSSBAR SWITCHING DEVICE

Filed June 29, 1945 6 Sheets-Sheet 5

INVENTORS.
KENNETH W. GRAYBILL
HANS SENGEBUSCH

BY Chas. W. Candy

ATTORNEY

April 24, 1951 K. W. GRAYBILL ET AL 2,550,241

CROSSBAR SWITCHING DEVICE

Filed June 29, 1945 6 Sheets-Sheet 6

INVENTORS.
KENNETH W. GRAYBILL
HANS SENGEBUSCH

BY Chas. W. Condy.

ATTORNEY

Patented Apr. 24, 1951

2,550,241

UNITED STATES PATENT OFFICE 2,550,241

CROSSBAR SWITCHING DEVICE

Kenneth W. Graybill, Elmhurst, and Hans Sengebusch, Villa Park, Ill., assignors to Automatic Electric Laboratories, Inc., Chicago, Ill., a corporation of Delaware Application June 29, 1945, Serial No. 602,232

8 Claims. (Cl. 179—27.54)

The present invention relates in general to switching systems and more particularly to switching apparatus of a kind suitable for use in establishing connections between subscribers' lines in an automatic telephone system.

Broadly speaking, the object of the invention is to provide a new and improved switching unit for use in systems of the foregoing character, which is of simple and rugged construction, positive in operation, more economical to manufacture and more compact in size than is the apparatus commonly used for this purpose.

In manufacturing telephone systems of the "all relay" type, one of the major items of expense is that of constructing and installing the multiple which extends between the contacts of the various relays. Such a multiple ordinarily takes the form of a cable made up of many insulated wires, each wire being brought out of the cable at intervals and manually soldered to contacts of the different relays. A special object of the present invention is to eliminate such cables in a system of this kind, and to greatly reduce the number of soldered junctions.

One feature of the invention is the provision of an improved relay mounting arrangement wherein all relays to be multipled are so oriented as to reduce the length of the multiple. More particularly, the physical arrangement of certain group relays and subgroup relays (or, as they are sometimes designated, "tens" relays and "units" relays) is so correlated with their circuit arrangement as greatly to simplify the multiple therebetween. Another feature resides in the provision, in conjunction with such a relay mounting arrangement, of a system of multiples made up of bare or uninsulated conductors.

A further feature is the provision of a standardized link assembly containing group relays and subgroup relays, such that any desired number of these standard link assemblies may readily be combined and interconnected by a bare wire multiple to form a complete switching apparatus.

Another feature is the provision of an improved subassembly containing a plurality of subgroup relays, which may easily be attached to and detached from the link assembly as a unit.

Still another feature is the provision of an improved group relay of the gang type, which is compact yet rugged and very reliable in operation. A further feature lies in the provision of an improved form of electrical contact suitable for use on a relay.

Figure 1:
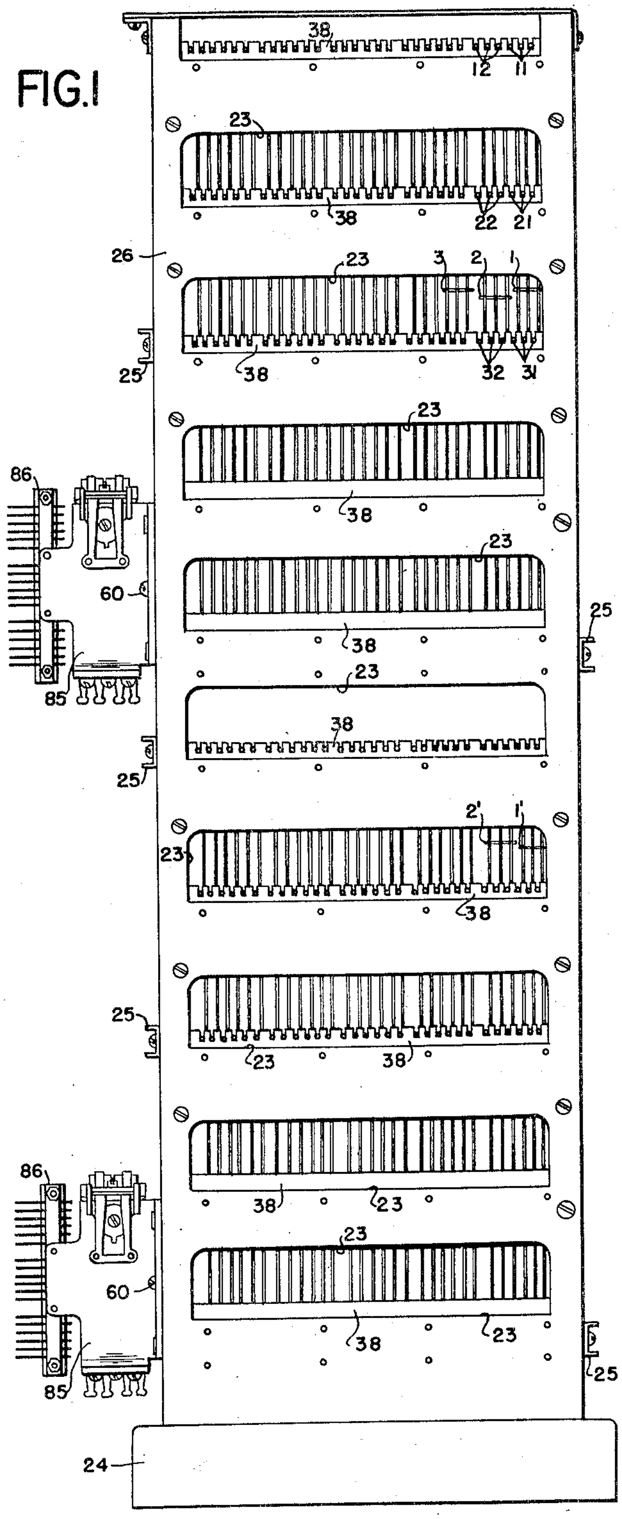
Figure 16:
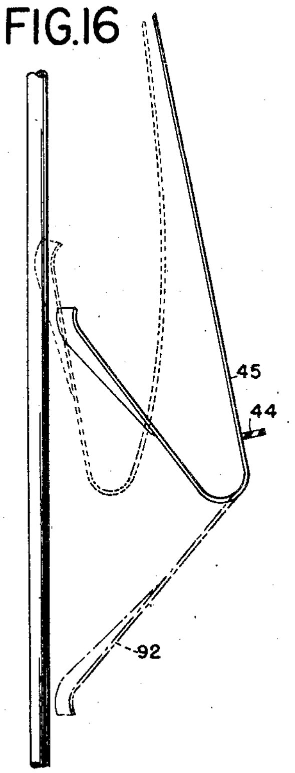
Figure 17:
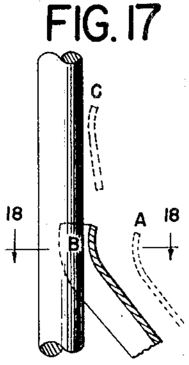
Figure 18:
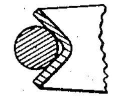
Figures 2, 15:
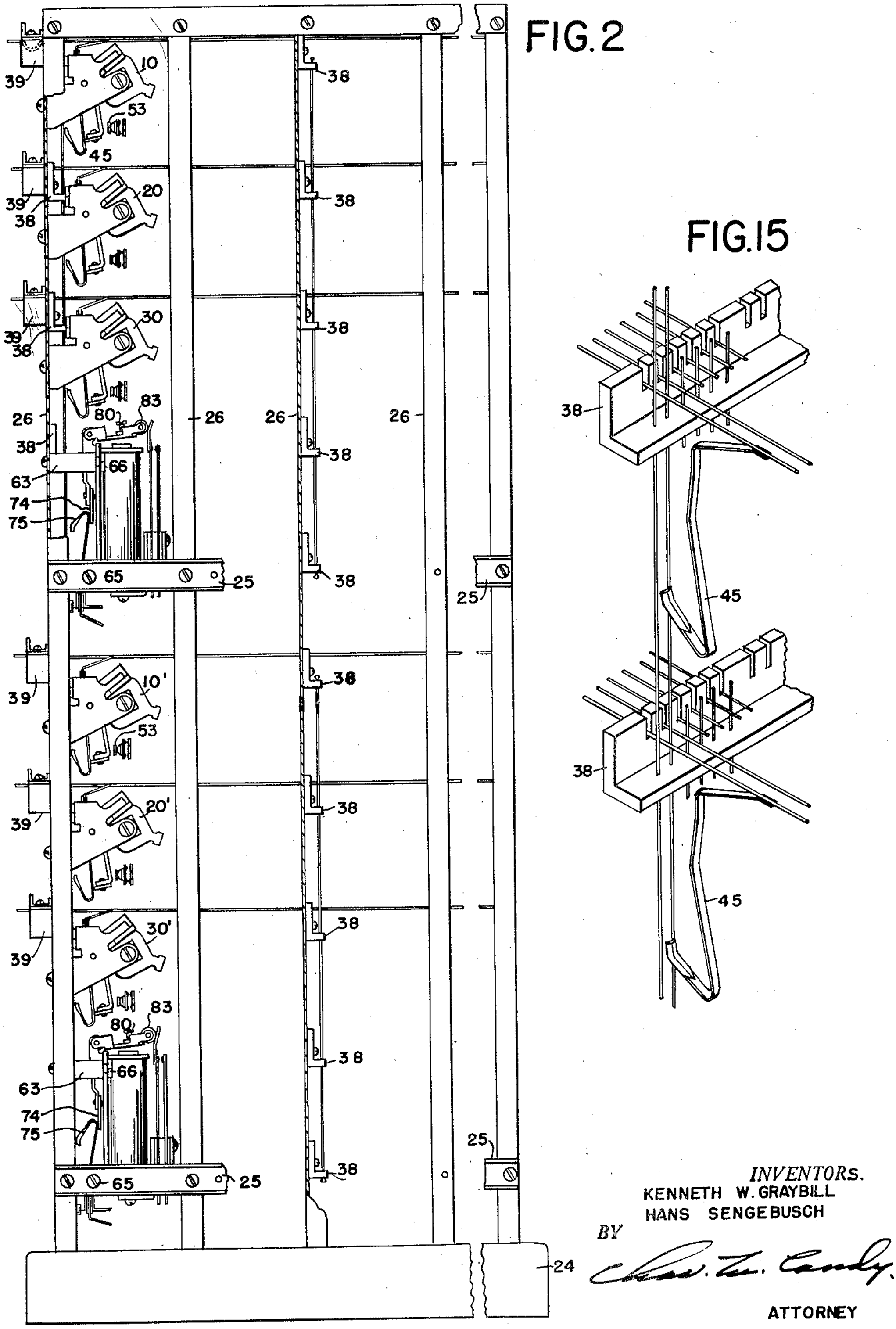
Figure 4:
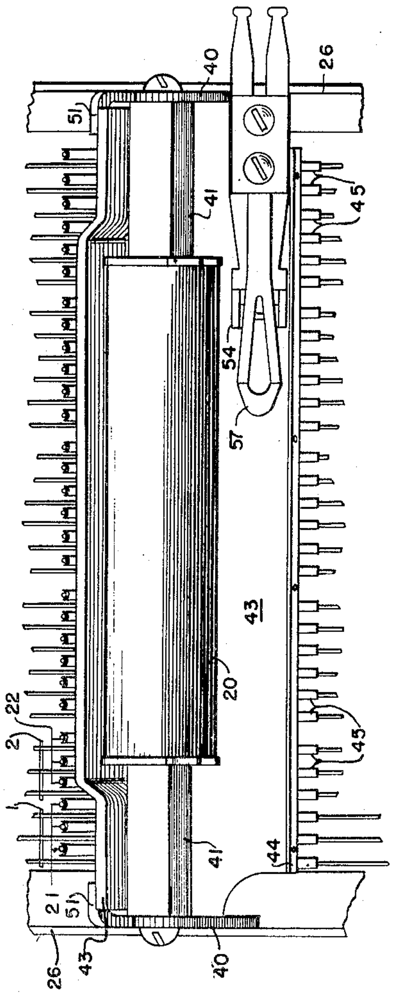
Figure 5:
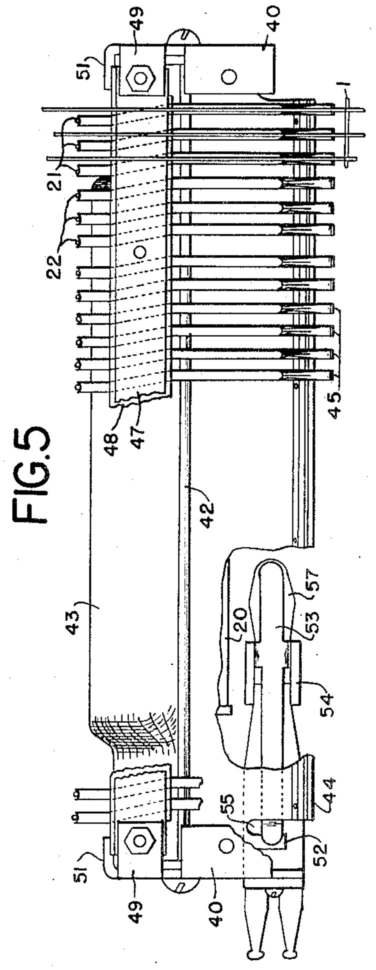
Figure 3:
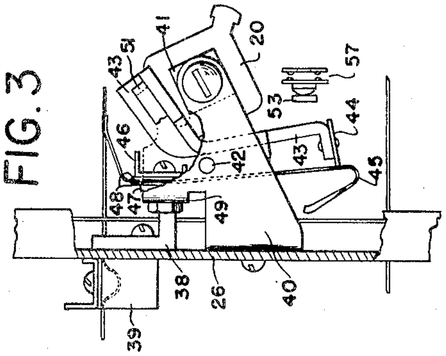
Figure 6:
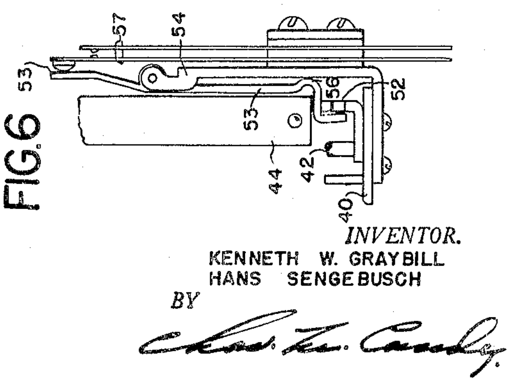
Figure 12:
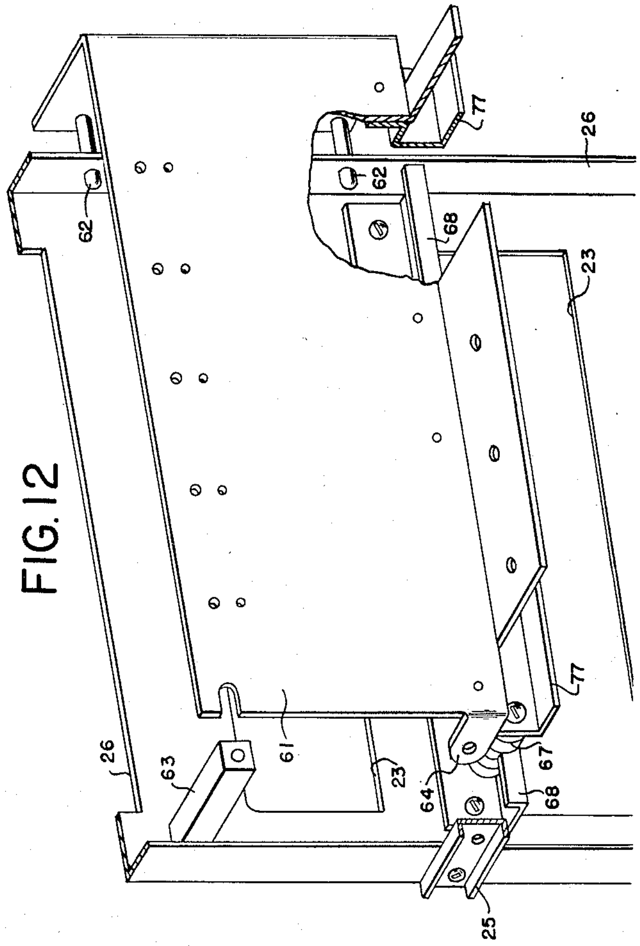
Figure 7:
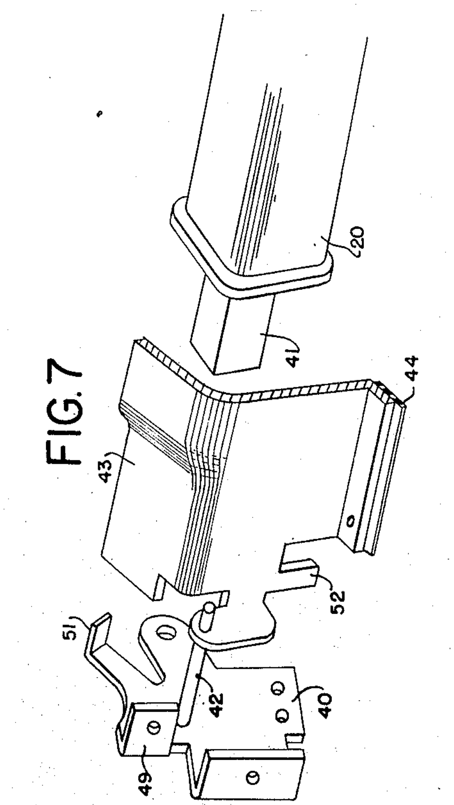
Figure 11:
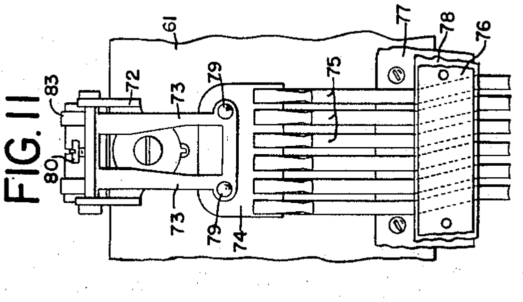
Figures 8, 9, 10, 13:
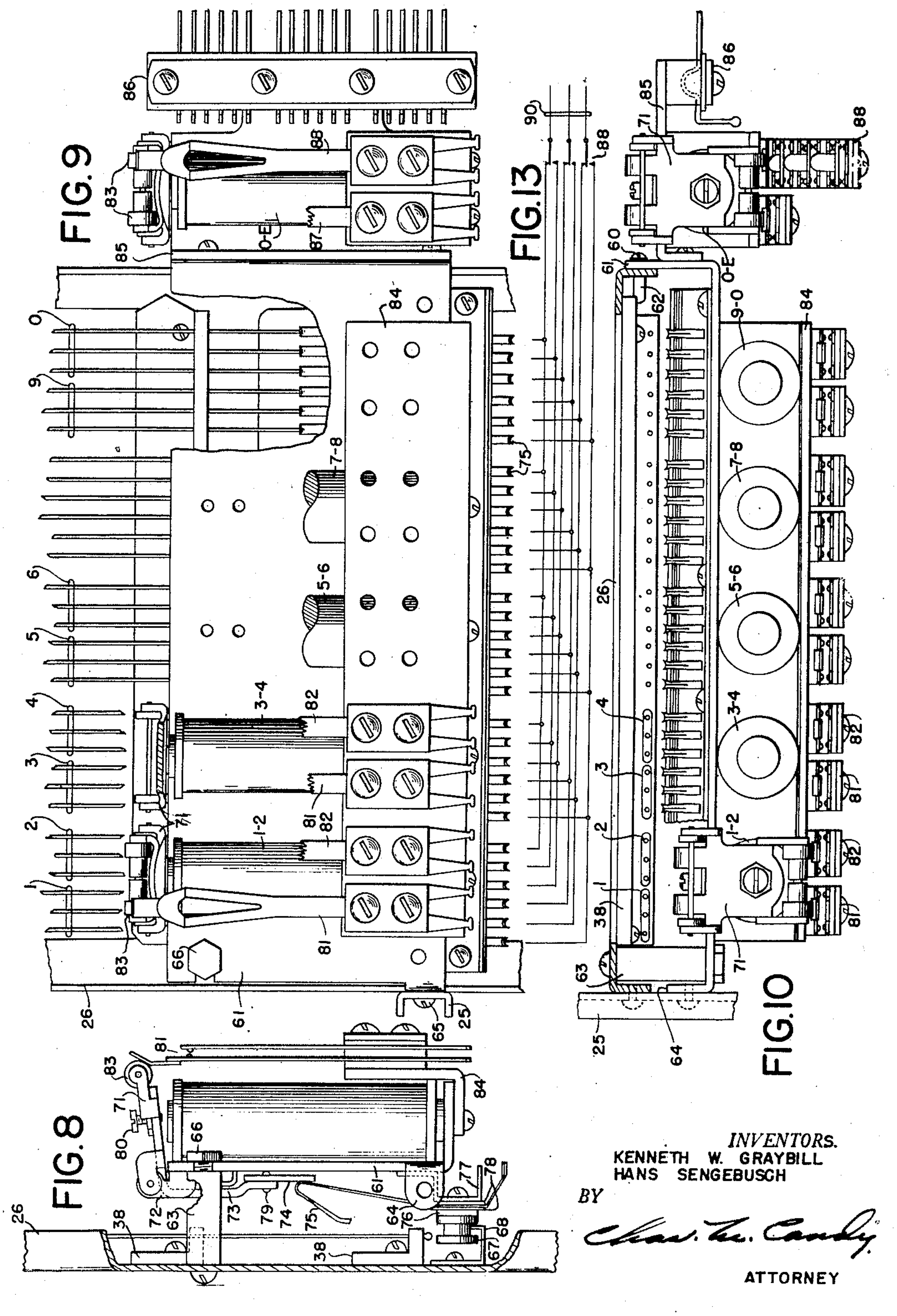
Figure 14:
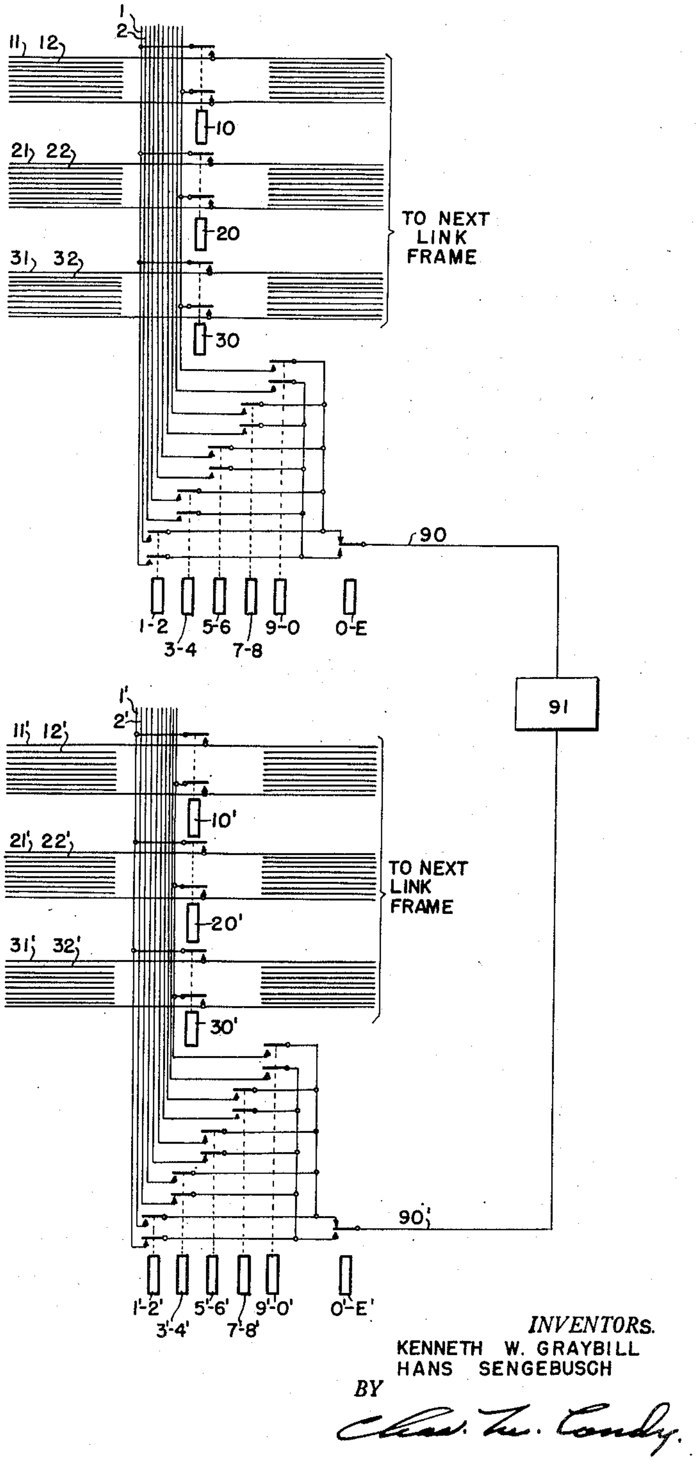

Additional objects and features will be pointed out in the course of the following detailed explanation of the invention taken in connection with the accompanying drawings, in which Fig. 1 is a side view of a single link switching frame, Fig. 2 is a view showing how a plurality of such link frames are assembled side by side to form a complete switching apparatus, Fig. 3 is an enlarged end view of one of the group relays shown in Fig. 2, part having been cut away for the sake of clarity, Figs. 4 and 5 are front and rear views, respectively, of the group relay, Fig. 6 is a fragmentary view of the bottom of the group relay, Fig. 7 is an exploded perspective view of a portion of the group relay, Fig. 8 is an enlarged end view of the subgroup relay assembly shown in Fig. 2, Figs. 9 and 10 are front and top views, respectively, of the subgroup relay assembly, Fig. 11 is a fragmentary rear view of the subgroup relay assembly, Fig. 12 is a perspective view, showing details of the mounting arrangement for the subgroup relay assembly, Fig. 13 is a schematic wiring diagram for the subgroup relay assembly, Fig. 14 is a schematic trunking diagram, showing how connections are extended through the complete switching apparatus, Fig. 15 is a fragmentary perspective view showing details of the bank multiple and two relay contacts associated therewith, Fig. 16 is an enlarged view of one relay contact, Fig. 17 is a still more enlarged view of a portion of a relay contact, and Fig. 18 is a cross sectional view taken along the line 18—18 of Fig. 17.

Referring to Figs. 1 and 2, the individual link frames 26 are stamped out of rather heavy sheet metal stock, each being provided with a number of generally rectangular openings 23 arranged one above another so that the frame is somewhat ladder-like in appearance. For increased rigidity, the lateral edges of each frame are bent over at right angles to the center portion thereof. Thus formed, the individual frames are screwed or welded to a base 24 and are held in a vertical position, parallel to one another, by a plurality of horizontal channel members 25 which are fastened by screws to the individual frames.

This forms a box-like structure, open on the sides. It constitutes a support for groups of horizontal conductors and groups of intersecting vertical conductors, as well as certain associated connecting devices or relays. The arrangement of the conductors will be described first.

Each frame 26 carries two groups of vertical conductors, one group being situated in the upper half of the frame and the other group being situated in the lower half. There are 30 vertical conductors in each group, these comprising 10 "trunks" of three conductors per trunk. Thus, referring to Fig. 1, conductors 1 make up the first trunk in the upper group, conductors 2 make up the second trunk, conductors 3 make up the third trunk, and so on. It will be noted that the thirty conductors of each group are arranged side by side in the same plane and that they are so spaced as to form five subgroups of 6 conductors (or 2 trunks) each.

Associated with the upper group of vertical conductors are three groups or levels of horizontal conductors. There are 30 conductors in each level, these comprising 10 "lines" of three conductors per line. In Fig. 1, conductors 11 make up the first line in the top level, conductors 12 make up the second line, and so on; likewise conductors 21 and 22 make up the first and second lines, respectively, of the second level, while conductors 31 and 32 make up the first and second lines, respectively, of the third level. Ninety horizontal conductors, similarly arranged in three levels, are associated with the lower group of vertical conductors.

The aforementioned conductors may be of relatively stiff bare wire or other suitable material, the vertical ones passing through holes drilled in the L-shaped supporting insulators 38 while the horizontal ones lie in slots in the same. Preferably the bare wire conductors are circular in cross section, but wire of any other cross section, for instance square or oblong, could be employed. The holes and the slots in each of the insulators 38 are staggered with respect to one another so that the horizontal and vertical conductors cross in interlacing fashion, without touching. The ends of the vertical conductors are flared somewhat to prevent them from moving up or down in the insulators 38, while the horizontal conductors are clamped at one end in terminal blocks 39, which prevent rotation of the latter conductors and also facilitate the soldering of electrical connections thereto.

At each intersection of the horizontal conductors with the vertical conductors a group relay (sometimes called a "tens relay") is provided for electrically connecting the horizontal conductors at that intersection to the respectively corresponding vertical conductors thereat. In Fig. 2, six such group relays are shown mounted upon the left-hand frame 26; none are shown on the remaining frames 26, but it will be appreciated that in practice these are equipped in the same way as the left hand frame. The detailed construction of one of the group relays is illustrated in Figs. 3 to 7, inclusive, and now will be described with reference thereto.

The relay is supported upon frame 26 by a pair of non-magnetic end plates 40 which are secured to the frame by screws. These end plates are irregular in shape, as best seen in Fig. 7, and may be made for example of brass. Supported between them is an elongated horizontal bar 41, its respective ends fastened to the two plates by screws. Square in cross section, this bar is made of soft iron or other suitable magnetic material; it forms the core of an electromagnetic coil 20 wound thereon between two insulators, each of the insulators being staked or otherwise rigidly affixed to the core and being provided with a forwardly extending lug about which one end of the coil is wound to facilitate soldering.

Parallel to the core of the electromagnet is an elongated shaft 42, its two ends supported by the end plates 40. This shaft carries a pivotal armature 43, the main portion of which is flat and approximately vertical. The upper end of the armature is bent over at an angle, and the central portion thereof is arched upwardly somewhat so that it will clear coil 20 in all positions of the armature. Riveted to the lower edge of the armature is a strip 44 of stiff insulating material which engages thirty hook shaped (or J-shaped) contact springs 45. These contact springs, disposed side by side along the length of the relay, are clamped between a channel member 46 and a bar 47 but are insulated therefrom by intervening strips of insulating material 48; the contact assembly thus formed is bolted to a pair of lugs 49 on the respective end plates, whereby the lower end of each contact spring is positioned opposite a particular one of the vertical bare wire conductors. At the same time, due to a diagonal shank portion best seen in Fig. 5, the upper end of each contact spring is brought into engagement with a particular one of the horizontal bare wire conductors, permitting the two conveniently to be soldered together.

Referring to Fig. 3, the contact springs 45 are so tensioned that they urge the pivotal armature 43 to rotate in a counter-clockwise direction. Its rotation in this direction is limited by a pair of stops 51 provided on the end plates, whereby the armature normally occupies the position in which it is shown in Fig. 3. When coil 20 is energized, however, attractive magnetic forces are set up between the core 41 and the armature 43, causing the latter to rotate in a clockwise direction until its upper outer ends engage the corresponding ends of the core. This flexes the thirty contact springs 45 so that each engages the vertical conductor opposite which it is positioned, thus completing an electrical circuit between that vertical conductor and the horizontal conductor to which said contact spring is soldered.

When the bottom edge of armature 43 moves to the left upon energization of the electromagnet (see Figs. 5 and 6) a lug 52 thereon engages one end of arm 53 and rotates it a slight amount. This arm is pivotally mounted on a bracket 54, which is fastened to one end plate by screws; it extends through a slot 55 in the armature and contains a U-shaped bend, the bottom portion of which (56) normally rests against bracket 54 due to the tension of springs in the contact set 57. Rotation of arm 53 operates the contact set, it being appreciated that this set may contain other contact springs in addition to, or instead of, the ones shown. The configuration of the individual contact springs preferably is like that disclosed in U. S. Patent No. 2,272,496, issued February 10, 1942, to F. E. Wood. (In order to avoid confusing the drawings, bracket 54 has not been shown in Figs. 2 and 3, and arm 53 has been shown only in part. The arrangement will be fully understood, however, from the remaining figures.)

In addition to the group relays described above, certain subgroup relays (sometimes called "units relays") are mounted upon each link frame 26, and the arrangement of these now will be explained with reference to Figs. 8 to 12, inclusive. They are supported by a base plate 61 which is detachably affixed to the frame in a manner best seen in Fig. 12. A pair of pins 62 welded or riveted one above the other to plate 61 fit into a corresponding pair of holes in frame 26, thereby to support one end of the plate; they are assisted by a screw 60 (see Figs. 1 and 10) which extends through plate 61 into a tapped hole in the frame. The other end of the base plate is bolted at the top to a spacing member 63 which is rigidly affixed to the frame, while a lug 64 near the bottom is fastened by a screw 65 to the horizontal channel 25.

In order to remove the base plate from the frame it is necessary only to remove screws 60 and 65 and to loosen bolt 66, the plate then being withdrawable in an endwise direction as indicated in Fig. 12. The process is reversed in replacing the plate. When relays are mounted upon the base plate as will be described presently the assembled unit is rather heavy, and accordingly a slotted wheel 67 is provided thereon which, during removal and replacement of the unit, rides on a rail 68 to help carry the weight. This rail, a trough-like member having an upturned outer edge, is rigidly affixed to frame 26 by screws. It will be appreciated that one of these units may be removed and replaced even when it is positioned between two rather closely spaced frames 26, as illustrated in Fig. 2. (In the latter figure two such units are shown mounted on the left hand frame, one being associated with the upper group of vertical conductors and the other being associated with the lower group of vertical conductors. None are shown on the remaining frames 26, but in practice these are equipped in the same way as the left hand frame.)

Considering now the equipment mounted upon each base plate 61, this includes five relay coils corresponding respectively to the aforementioned five subgroups of vertical conductors. Each relay coil is positioned in front of the associated subgroup of vertical conductors (see Figs. 9 and 10) and is numbered to correspond with the trunks represented in that subgroup. Thus, the relay coil disposed in front of the conductors which comprise trunks 1 and 2, is numbered 1—2. In like fashion coil 3—4 is situated before the conductors making up the third and fourth trunks, coil 5—6 is situated before those making up the fifth and sixth trunks, and so on.

Associated with the upper end of each of the five coils is a pivotal armature 71. Made of magnetic material, these armatures are carried by individual non-magnetic brackets 72 which are secured rigidly to the base plate 61 in a conventional fashion. Riveted to the lower end of two arms 73 extending down from each armature is a relatively stiff insulator 74 which engages six flexible contact springs 75. In all, there are thirty such contact springs, six for each relay armature. These thirty springs are clamped between bar 76 and a channel member 77 secured to the base plate, being insulated from both by strips of insulating material 78; they are disposed side by side in such spaced relationship that each is opposite a particular one of the vertical bare wire conductors.

Under the influence of the contact springs 75 which tend to rotate the armatures 71 in a counter-clockwise direction (see Fig. 8) each armature normally occupies the position shown. When any one of the relay coils is energized, however, its associated armature is drawn down toward the core of that magnet, causing insulator 74 to push the six contact springs engaged therewith into contact with the six respectively corresponding vertical conductors. At the same time two sets of auxiliary contact springs 81 and 82 are operated by a pair of rollers 83 on the front edge of the armature. There are ten sets of auxiliary contact springs in all (two for each relay) and they are mounted on an L-shaped bracket 84 which is rigidly fastened to base plate 61 by screws. Each set may contain other contact springs in addition to, or instead of, the ones shown, the configuration of the individual springs being like that disclosed in the aforementioned Patent No. 2,272,496.

It will be noted that the base plate 61 which is made of suitable magnetic material forms a common heel piece, or flux return path, for all five of the electromagnets described above. The rivets 79 in each relay armature, which normally abut against plate 61, are made of non-magnetic material; otherwise the tendency of stray flux to pass over these rivets from the arms 73 to the heel piece 61 upon energization of the associated relay coil would resist movement of the armature away from its normal position. Each of the armatures also has a non-magnetic residual screw 80 of conventional type, for preventing any delay in the restoration of the armature to normal after deenergization of the relay coil due to residual magnetism in the magnetic structure.

A sixth relay is mounted upon each base plate 61. Hereinafter referred to as the "odd-or-even" relay, this has a coil O—E supported on a heel piece 85, which is in the form of a bracket rigidly secured to plate 61 by screws. For wiring purposes a terminal block 86 is mounted on the outer end of the bracket. The armature of this sixth relay is essentially like those of the five subgroup relays described above, and its two sets of contact springs 87 and 88 correspond in construction and mode of operation to the contact sets 81 and 82. The only substantial difference between the odd-or-even relay and one of the subgroup relays, indeed, lies in the fact that, as shown in Fig. 1, it has no contact springs corresponding to springs 75.

Any suitable circuit connections may be wired to the soldering terminals of contact springs 75. Preferably, however, these terminals will be connected to the springs of contact set 88 on the odd-or-even relay in the manner indicated schematically in Fig. 13. If this is done, those springs 75 which are engageable with the vertical bare wire conductors making up the even numbered trunks (i. e., trunks 2, 4, 6, 8, and 10) are all connected in multiple to conductors 90 when the odd-or-even relay is in its normal position. Alternatively, when the odd-or-even relay is operated, conductors 90 are connected in multiple to those springs 75 which are engageable with the vertical bare wire conductors making up the odd numbered trunks (1, 3, 5, 7 and 9). This permits conductors 90 to be selectively connected to any desired trunk by operating the subgroup relay disposed in front of that trunk and further operating the odd-or-even relay if the desired trunk is an odd numbered one. For instance, simultaneous energization of relay coils 3—4 and O—E will connect the conductors of trunk 3 to conductors 90, while energization of relay coil 3—4 alone will connect trunk 4 to conductors 90.

With conductors 90 thus connected to a particular vertical trunk, assume that the group relay associated with any one of the three levels of horizontal lines intersecting that trunk now is operated. The connection from conductors 90 now will extend not only to the vertical trunk in question but thence over contacts of the operated group relay to a particular horizontal line in the level corresponding to that relay. In short, conductors 90 may be connected to any desired horizontal line in any one of the three levels by operating a particular group relay, a particular subgroup relay and (if the line is an odd numbered one) the odd-or-even relay. This will be made clearer by reference to Fig. 14 which illustrates schematically one form of switching system in which the complete switching apparatus described above may be used to advantage.

Fig. 14 comprises a simplified one-line trunking diagram wherein each line represents three conductors in the actual apparatus. Thus the three vertical conductors making up trunk 1 in Figs. 1, 4, 5, 9 and 10 are represented by a single vertical line 1 in Fig. 14; likewise the three horizontal conductors making up line 21 (Figs. 1, 4 and 5) are represented by a single horizontal line 21 in Fig. 14. Other lines in the schematic diagram are similarly correlated with the actual structure through the use of identical reference characters on corresponding items of equipment.

It will be noted that there are two groups of vertical trunks in Fig. 14, one group positioned above the other as is true of the trunks carried by any particular one of the link frames 26; intersecting each group of vertical trunks are three groups of horizontal lines corresponding to the three levels of conductors in the actual apparatus. Contacts on the subgroup relays and the odd-or-even relay are shown connected as discussed above with reference to Fig. 13, and the common lead 90 of the upper set is shown connected to the corresponding lead 90' of the lower set via intermediate link equipment 91.

For purposes of illustration it will be assumed that the trunking arrangement illustrated is employed to complete calls between different telephone substations in an automatic telephone system. It will be assumed further that there are thirty substations each having an individual line circuit of conventional type (not shown). This individual line circuit is connected to a particular one of the upper thirty horizontal lines and also to the corresponding one of the lower thirty lines, all outgoing calls from the associated substation being extended over the upper connected line and all incoming calls thereto being completed over the lower connected line. The line circuit of the first substation thus will be connected to lines 11 and 11' of Fig. 14, that of the second substation will be connected to lines 12 and 12', and so on.

When the subscriber at the first substation lifts his receiver to make a call, relays 10, 1—2, and O—E operate automatically under control of auxiliary apparatus forming no part of the present invention, whereupon he is connected over line 11, the upper contact of relay 10, trunk 1, lower contact of relay 1—2 and operated contact of relay O—E to the intermediate equipment 91. He then dials the number of the wanted substation. Supposing that this is the thirtieth substation, relays 30' and 9'—0' now will be operated, whereupon the connection is further extended from the intermediate equipment 91 over conductor 90', the contact of relay O'—E' in its normal position, the upper contact of relay 9'—0', trunk 0', and the lower contact of relay 30' to the line of the called substation. In like fashion any one of the thirty substations may call any other one thereof. Simultaneous calls are completed over different link frames, each of which is equipped like the left hand frame (26) in Fig. 2 and wired as shown in Fig. 14. As many of these frames are provided as are needed to handle the maximum number of simultaneous calls.

Although the switching apparatus has been disclosed in connection with a thirty line telephone system, it will be appreciated that it easily can be made to accommodate more lines, or less, as may be desired. For a hundred line system the structure would be taller, the vertical conductors of each group would be longer, and ten levels of horizontal conductors (instead of the three shown) would be provided intersecting the vertical conductors of each group. At each such intersection there would be a group relay, but no increase in the number or arrangement of subgroup relays would be required.

Returning once more to the contact springs which are employed to make electrical connection with the vertical bare wire conductors, attention is directed particularly to the shape thereof. Springs 45 on the group relays and springs 75 on the subgroup relays are essentially alike in form, the latter springs simply being mounted in an inverted position as compared with the former. Each spring has two sections of unequal length; the longer section is supported at one end in the manner previously described, and the shorter section is doubled back from the free end of the longer section in such a way as to give the spring a modified V-shape.

Terminating the shorter section is a trough-like or grooved portion which is adapted to engage the associated bare wire conductor at two points, as indicated in Fig. 18. Dirt or other foreign matter occasionally may insulate the wire from the spring at one of these points, but it is highly improbable that such ever will occur at both points at the same time, and accordingly the dual contact surfaces greatly increase the electrical reliability of the contact. It will be appreciated that the bare wire and both sections of the associated contact spring are intended to lie in a common plane, but due to manufacturing tolerances it sometimes may happen that the free end of the shorter spring section is displaced slightly to one side of this plane. In such a case, when the spring is flexed by the associated relay one sloping surface of the grooved end of the spring will engage the wire first and will cooperate with the wire to draw the shorter spring section into alignment with the wire. Small variations in the position of the free end of the spring thus are corrected or adjusted automatically.

In order to deflect any contact spring from its normal position, a force is applied to the longer section thereof near its free end. The initial movement of operating member 44 to the left (Fig. 16) produces a corresponding movement of the contact making end of the spring to the left, thus to bring the spring into engagement with the vertical wire; then, during the ensuing movement of the operating member to the left, the contact making end of the spring slides upwardly along the wire, so that when member 44 reaches its maximum displacement the spring is flexed in the way shown by dotted lines. The spring's normal position A, the point at which it first engages the wire, B, and its final position C are shown in an enlarged scale in Fig. 17. When its associated relay armature restores to normal the spring first moves from C to B and then moves from B to A.

As the spring slides along the wire between points B and C it produces a wiping action which tends to remove from the wire any film which may be present thereon in the path of such movement. It will also be noted that as the spring moves from B to C its slope with respect to the wire changes progressively; this produces a rocking movement of the spring about its curved tip, which not only improves the spring's tendency to wipe the wire clean but also causes the changing contact area of the spring itself to be cleaned in similar fashion.

Still another advantage is derived from this form of relative movement between the spring and the wire. If they are used to make or break live electrical circuits, any corrosive action due to arcing or the like will take place, if at all, either as the spring first engages the wire or as it leaves the wire, i. e., at point B. The surface areas damaged by such action consequently are not the ones ultimately used to carry current (i. e., those shown in engagement at C), and this manifestly improves the electrical reliability of the contact.

It will be seen that a somewhat similar wiping action would be obtained if the shorter section of the contact spring made an obtuse angle with the longer section, as indicated by dot and dash lines at 92 in Fig. 16. Bending the spring back upon itself at an acute angle, however, permits the group relays to be mounted one above another in more closely spaced relationship than otherwise would be possible, with a consequent saving of space and corresponding gain in the overall compactness of the complete switching equipment.

Furthermore, tests disclose that certain operating characteristics of reversed bend type of spring are considerably more favorable than those of its somewhat straighter counterpart. To cause the reversed bend spring to exert a certain force on the vertical wire (thus to insure good electrical contact therewith) it is necessary for the contact operating member 44 to apply an approximately equal force to the spring; to cause the equivalent straighter spring (92) to exert the same force on the wire, however, it would be necessary for member 44 to apply approximately three times as great a force to the spring. In other words, for a given force applied to the spring by member 44, the reversed bend spring exerts approximately three times as great a force upon the wire as would be exerted by the straighter spring. This greater contact pressure makes the electrical reliability of the reversed bend spring considerably greater than that of a straighter spring.

Having fully described the invention, what we believe to be new and desire to protect by Letters Patent is set forth in the appended claims.

What is claimed is:

1. In a switching device, an L-shaped heelpiece, a plurality of electromagnets mounted side by side on one branch of said L-shaped heelpiece so that their longitudinal axes lie in a common plane parallel to the other branch of said heelpiece, a plurality of armatures corresponding respectively to said electromagnets, means for pivotally mounting each of said armatures on said heelpiece adjacent the end of its corresponding electromagnet, whereby that armature is operated by the asociated electromagnet over a magnetic circuit including said heelpiece, and electrical contact springs individual to each armature operated by that armature.

2. In a switching device, an L-shaped heelpiece, a plurality of electromagnets mounted side by side on one branch of said L-shaped heelpiece so that their longitudinal axes lie in a common plane parallel to the other branch of said heelpiece, a plurality of armatures corresponding respectively to said electromagnets, means for movably mounting each of said armatures on said heelpiece adjacent the end of its corresponding electromagnet, whereby that armature is operated by the associated electromagnet over a magnetic circuit including said heelpiece, two sets of electrical contact springs individual to each armature operated by that armature, means whereby one of said sets is carried by said one branch of said heelpiece, and means whereby the other of said sets is carried by said other branch of said heelpiece.

3. In a switching device, an L-shaped heelpiece, a plurality of electromagnets mounted side by side on one branch of said L-shaped heelpiece so that their longitudinal axes lie in a common plane parallel to the other branch of said heelpiece, a plurality of armatures corresponding respectively to said electromagnets, means for movably mounting each of said armatures on said heelpiece adjacent the end of its corresponding electromagnet, whereby that armature is operated by the associated electromagnet over a magnetic circuit including said heelpiece, each armature having individual thereto certain contact springs carried by said heelpiece, a frame, a plurality of stationary conductors carried by said frame, means for detachably securing said heelpiece to said frame in such a position as to bring each of said contact springs opposite a different one of said stationary conductors, whereby the operation of any one of said armatures is effective to move the contact springs individual to that armature into electrical contact with the conductors disposed opposite the respective ones of the moved springs.

4. A switching device as claimed in claim 3, wherein said heelpiece securing means includes a plurality of bayonet pins and corresponding holes for receiving said pins.

5. In a switching system, groups of lines, primary relays, each said primary relay corresponding to one of the lines in each said group of lines, a secondary relay individual to each said group of lines, a common link, groups of rigid bare wire conductors equal in number to the number of said primary relays, each said group of conductors extending from one of said primary relays to all said secondary relays, means operative by each said primary relay for connecting said link to the group of bare wire conductors extending from that primary relay to all said secondary relays, means operative by each said secondary relay for connecting the lines of its group of lines to said groups of bare wire conductors, the concurrent operation of any one of said primary relays and any one of said secondary relays effective for causing said first means and said second means to connect said link to the line corresponding to the operated primary relay in the group of lines individual to the operated secondary relay.

6. In a switching system, groups of lines, links, a frame carrying a connecting device for each said group of lines and a plurality of groups of bare wire conductors, each said device having contact springs connected to the lines of one of said groups of lines and operative by that device for extending the lines of said one group of lines respectively to the groups of said conductors, said frame further carrying other connecting devices corresponding individually to one group of said conductors and also corresponding individually to one line of each said group of lines, each said other device having contact springs connected to one of said links and operative by that other device for extending said one link to the group of said conductors corresponding to that other device, the concurrent operation of one of said other devices and one of said first mentioned devices causing the link connected to the operated other device to be extended to the line corresponding to the operated other device in the group of lines connected to the operated first device.

7. In a switching device, the combination of first and second rows of conductors located in two spaced parallel planes, a third row of conductors located in a plane intersecting said parallel planes, contact springs adjacent the intersection of said first row with said third row attached to the conductors of said first row and operative for connecting with the conductors of said third row, means for operating said contact springs attached to the conductors of said first row to interconnect the conductors of said first and third rows, contact springs adjacent the intersection of said second row with said third row attached to the conductors of said second row and operative for connecting with the conductors of said third row, means for operating said contact springs attached to the conductors of said second row to interconnect the conductors of said second and third rows, a row of contact springs corresponding respectively to the conductors of said third row, said row of contact springs being divided into groups, means individual to each said group of contact springs operative for connecting that group of contact springs with the respectively corresponding conductors of said third row, the contact springs of one of said groups of contact springs electrically connected respectively to corresponding conductors of said first row when said means individual to said one group of contact springs and said first mentioned means are effective concurrently, the contact springs of said one group of contact springs electrically connected respectively to corresponding conductors of said second row when said means individual to said one group of contact springs and said second mentioned means are effective concurrently.

8. In a switching device, two rows of bare conductors in intersecting planes, an insulator located parallel to the line of intersection of said planes, said insulator having slots holding the conductors of one of said rows and holes holding the conductors of said other row thereby to maintain a fixed relationship between said two rows of conductors, each said conductor in one of said rows having connected to it a contact spring the free end of which is disposed opposite a corresponding conductor in the other of said rows, and means for deflecting said springs thereby to cause each spring to engage its corresponding conductor and rub along the length thereof for a given distance.

KENNETH W. GRAYBILL.
HANS SENGEBUSCH.

REFERENCES CITED

The following references are of record in the file of this patent:

UNITED STATES PATENTS

| Number | Name | Date |
|---|---|---|
| 1,472,503 | Taylor | Oct. 30, 1923 |
| 1,480,202 | Goodrum | Jan. 8, 1924 |
| 1,515,674 | Goodrum | Nov. 18, 1924 |
| 1,517,425 | Hendrickson | Dec. 2, 1924 |
| 1,528,763 | Goodrum | Mar. 10, 1925 |
| 1,541,343 | Goff | June 9, 1925 |
| 1,543,825 | Dobbin | June 30, 1925 |
| 1,563,658 | Richard | Dec. 1, 1925 |
| 1,825,414 | Norviel | Sept. 29, 1931 |
| 1,954,758 | Reisner | Apr. 10, 1934 |
| 2,137,503 | Obergfell | Nov. 22, 1938 |
| 2,137,514 | Voss | Nov. 22, 1938 |
| 2,322,219 | Boswau | June 22, 1943 |
| 2,396,077 | Blackhall | Mar. 5, 1946 |